United States Patent [19]

Davis

[11] Patent Number: 5,647,184
[45] Date of Patent: Jul. 15, 1997

[54] MODULAR DECKING PLANK, AND DECKING STRUCTURE

[75] Inventor: Harry H. Davis, Mooresville, N.C.

[73] Assignee: L. B. Plastics Limited, Belper, England

[21] Appl. No.: 589,728

[22] Filed: Jan. 22, 1996

[51] Int. Cl.[6] .................................. E04C 3/00; E04B 5/00
[52] U.S. Cl. .................... 52/592.1; 52/588.1; 52/177; 52/650.3; 52/100; 52/731.3; 52/732.2
[58] Field of Search ................................ 52/592.1, 591.1, 52/589.1, 789.1, 790.1, 100, 177, 730.4–732.3, 650.3, 588.1, 592.4; 405/118–121; 114/263, 266

[56] References Cited

U.S. PATENT DOCUMENTS

| | | | |
|---|---|---|---|
| 1,913,342 | 6/1933 | Schaffert | 52/588.1 |
| 3,043,407 | 7/1962 | Marryah | 52/177 X |
| 3,100,556 | 8/1963 | DeRidder | 52/542 X |
| 3,555,462 | 1/1971 | Costanzo | 52/177 X |
| 4,892,052 | 1/1990 | Zook et al. | 114/85 |
| 4,951,992 | 8/1990 | Hockney | 52/588.1 X |
| 5,048,448 | 9/1991 | Yoder | 52/588.1 X |
| 5,050,362 | 9/1991 | Tai et al. | 52/588.1 |
| 5,204,149 | 4/1993 | Phenicie et al. | 52/588.1 X |
| 5,351,458 | 10/1994 | Lehe | 52/177 X |

FOREIGN PATENT DOCUMENTS

| | | | |
|---|---|---|---|
| 1509652 | 1/1968 | France | 52/588.1 |
| 2552622 | 5/1977 | Germany | 52/588.1 |
| 406264600A | 9/1994 | Japan | 52/588.1 |
| 0401422 | 1/1966 | Switzerland | 52/588.1 |
| 0834138 | 5/1960 | United Kingdom | 52/588.1 |

Primary Examiner—Robert Canfield
Attorney, Agent, or Firm—Adams Law Firm, P.A.

[57] ABSTRACT

An elongate modular decking plank is provided for being assembled on a supporting subfloor together with a plurality of like planks to form a decking structure. The decking plank has a top wall spaced-apart from a bottom wall, and opposing laterally spaced side walls interconnecting the top and bottom walls. An integrally-formed fastening flange extends outwardly from the bottom wall on one of first and second sides of the decking plank. The flange includes a fastening portion for receiving fasteners therethrough to the supporting subfloor to mount the decking plank on the supporting subfloor. The plank is preferably extruded of a high-impact polymeric material, such as PVC plastic.

21 Claims, 9 Drawing Sheets

_Fig. 8_

_Fig. 9_

FIG. 14

MODULAR DECKING PLANK, AND DECKING STRUCTURE

TECHNICAL FIELD AND BACKGROUND OF THE INVENTION

This invention relates to a modular decking plank, and decking structure formed from an assembly of like planks. The decking plank of the invention is an elongate, one-piece modular unit preferably made of PVC plastic with integrally formed fastener components for providing ready and convenient assembly on a subfloor. The invention is applicable in the construction of boat docks, piers, decks, patios, walkways, pontoon boat floors, and the like.

The invention has numerous advantages over wooden decking structures of the prior art. Unlike wooden structures, the invention will not fade, rot, crack, splinter, or warp. There are no exposed nails or other fasteners at the surface of the decking structure which require replacement, or cause injury. The invention includes an embossed top surface to provide enhanced slip-resistance over wooden structures. Moreover, the invention can be supplied in several different colors and does not need painting or staining.

According to one prior art plastic decking plank, separate cap and base elements are snapped together to form a single plank. The base element is first mounted directly to the subfloor with fasteners such as screws or nails. Mating components of the cap and base elements are then manually aligned, and a rubber hammer or other tool is used to snap-attach the pieces together. Unlike the invention, such two-piece designs generally require substantial time and effort to assemble. The present one-piece design results in a considerably stronger and more rigid decking structure than a two-piece design while minimizing manufacturing and installation costs. In addition, due to the absence of engaging parts, the invention also produces less surface noise or squeaking than two-piece designs.

SUMMARY OF THE INVENTION

Therefore, it is an object of the invention to provide a modular, one-piece plastic decking plank which is assembled together with a number of like planks to form a decking structure.

It is another object of the invention to provide a modular decking plank which includes complementary, integrally-formed male and female fastener components.

It is another object of the invention to provide a modular decking plank which is relatively inexpensive to manufacture.

It is another object of the invention to provide a decking plank which includes hidden fasteners located below the top surface of the decking structure for mounting the plank to a supporting subfloor.

It is another object of the invention to provide a decking plank which is substantially more rigid and stronger than two-piece designs.

It is another object of the invention to provide a decking plank which does not produce substantial surface noise when walked upon.

It is another object of the invention to provide a decking plank which will not fade, rot, crack, splinter, or warp.

It is another object of the invention to provide a decking plank which includes a slip-resistant top surface.

It is another object of the invention to provide a decking plank which does not require painting or staining.

It is another object of the invention to provide a decking plank which includes hidden drainage openings for draining water from a top surface of the decking structure.

It is another object of the invention to provide a decking plank which includes integrally-formed, complementary fastener components which automatically space adjacent planks from each other. Separate spacers may be used to achieve exact parallel spacing between adjacent planks.

It is another object of the invention to provide a decking plank which does not require use of a separate spacer for spacing the plank apart from an adjacent plank.

These and other objects of the present invention are achieved in the preferred embodiments disclosed below by providing a modular decking plank for being assembled on a supporting subfloor together with a plurality of like planks to form a decking structure. The decking plank has a top wall spaced-apart from a bottom wall, and opposing laterally spaced side walls interconnecting the top and bottom walls. An integrally-formed fastening flange extends outwardly from the bottom wall on one of first and second sides of the decking plank. The flange includes a fastening portion for receiving fasteners therethrough to the supporting subfloor to mount the decking plank on the supporting subfloor.

According to one preferred embodiment of the invention, the fastening flange extends continuously along the bottom wall from one end of the decking plank to the other end of the decking plank.

According to another preferred embodiment of the invention, the fastening flange includes a second, male fastening portion integrally formed with the first fastening portion for attaching the plank to an adjacent like plank.

According to yet another preferred embodiment of the invention, the second, male fastening portion of the fastening flange extends in a plane offset from the plane of the first fastening portion.

According to yet another preferred embodiment of the invention, an integrally-formed female fastening channel extends along the bottom wall on a side of the decking plank opposite the fastening flange for receiving the fastening flange of an adjacent decking plank. The flange and the channel cooperate with each other to space the adjacent planks from each other and to attach the adjacent planks together.

According to yet another preferred embodiment of the invention, the female fastening channel extends continuously along the bottom wall from one end of the decking plank to the other end of the decking plank.

According to yet another preferred embodiment of the invention, locking means are provided for locking the male fastening portion of the fastening flange together with the female fastening channel of the adjacent decking plank.

According to yet another preferred embodiment of the invention, the locking means includes cooperating interfering shoulders formed respectively on the male fastening portion of the fastening flange and within the female fastening channel of the adjacent decking plank for locking the decking planks together.

According to yet another preferred embodiment of the invention, a longitudinally-extending groove is formed in the fastening flange for guiding the fasteners therethrough to mount the decking plank to the supporting subfloor.

According to yet another preferred embodiment of the invention, a plurality of spaced-apart holes are formed in the fastening flange for accommodating passage of the fasteners into the supporting subfloor, and for drainage of water from the surface of the decking structure.

5,647,184

3

According to yet another preferred embodiment of the invention, a parting line is formed along the length of the fastening flange for removing a section of the decking plank at an exposed edge of the decking structure.

According to yet another preferred embodiment of the invention, a trim channel is formed adjacent to the fastening flange for receiving decking trim at the exposed edge of the decking structure.

According to yet another preferred embodiment of the invention, the top, bottom, and side walls are integrally formed together.

According to yet another preferred embodiment of the invention, the side walls converge in direction of the bottom wall.

According to yet another preferred embodiment of the invention, a plurality of reinforcing ribs are located between the side walls, and interconnect the top and bottom walls of together.

According to one preferred embodiment of the invention, a modular decking plank has a top wall spaced-apart from a bottom wall, and opposing laterally spaced side walls interconnecting the top and bottom walls. An integrally-formed fastening flange extends outwardly from and along the bottom wall on a first side of the decking plank from one end of the decking plank to the other.

The flange includes a first fastening portion for receiving fasteners therethrough to the supporting subfloor. A second, male fastening portion is provided for attaching the decking plank to an adjacent like plank. An integrally-formed female fastening channel extends along the bottom wall on a second side of the plank from one end of the plank to the other for receiving the male fastening flange of an adjacent plank. The flange and the channel cooperate with each other to space the adjacent planks from each other and to attach the adjacent planks together.

A decking structure includes a plurality of decking planks s described above assembled together on a supporting subfloor.

BRIEF DESCRIPTION OF THE DRAWINGS

Some of the objects of the invention have been set forth above. Other objects and advantages of the invention will appear as the invention proceeds when taken in conjunction with the following drawings, in which:

4

FIG. 15 is a fragmentary, enlarged perspective view of the fastener flange used for beginning decking construction, and showing the

DESCRIPTION OF THE PREFERRED EMBODIMENT AND BEST MODE

Figure 1:
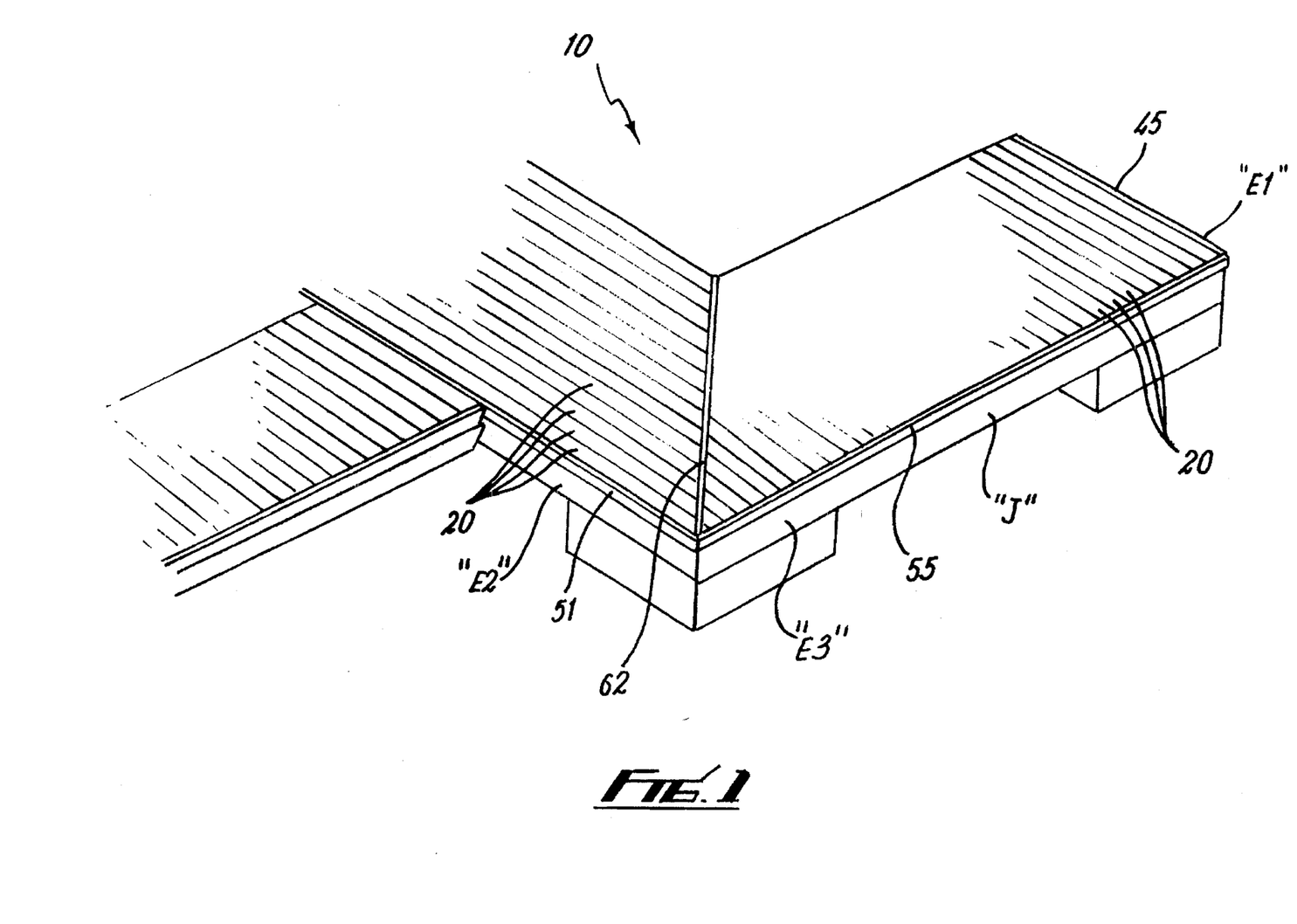
FIG. 1 is a fragmentary perspective view of a decking structure including an assembly of decking planks according to one preferred embodiment of the invention.
Figure 2:
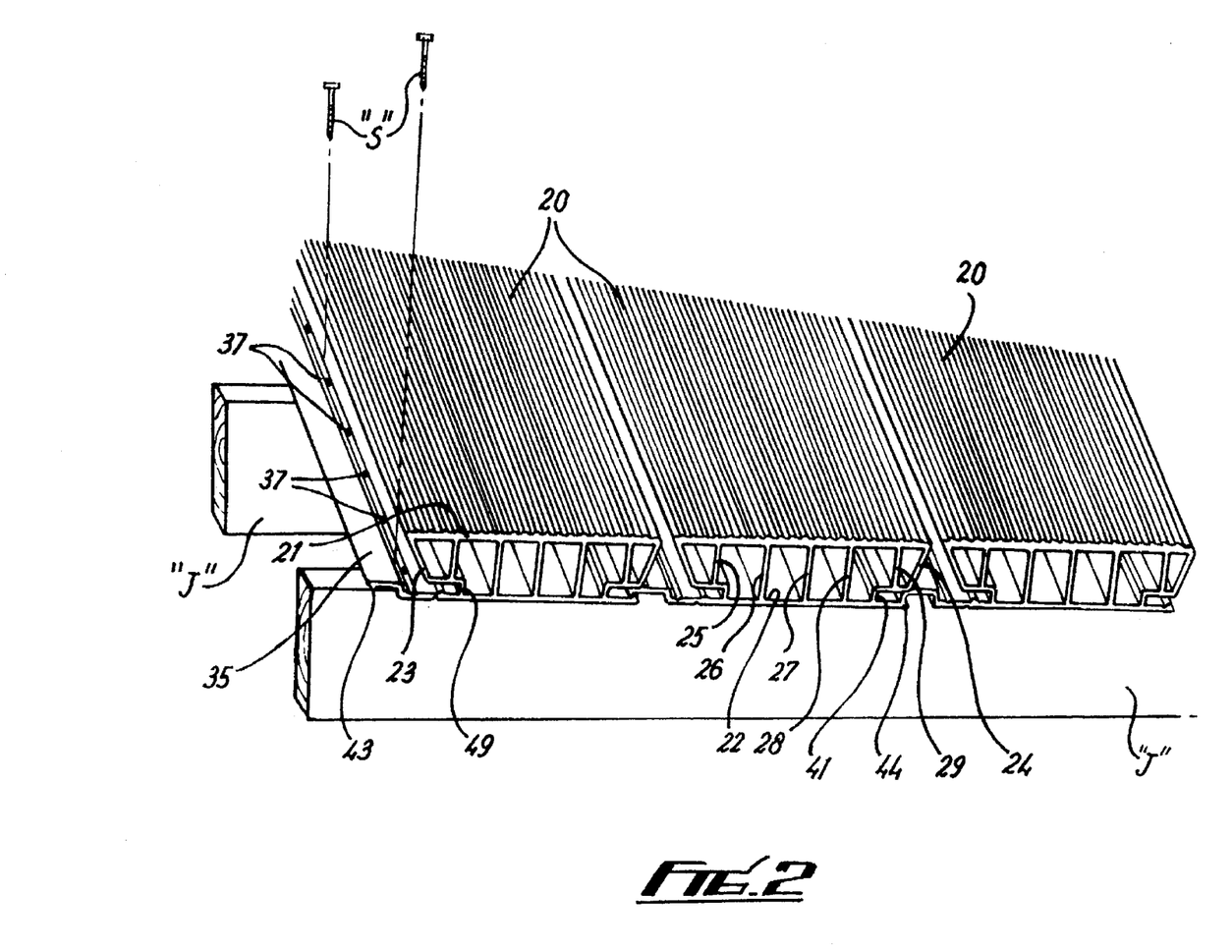
FIG. 2 is a fragmentary perspective view of a number of decking planks mounted to joists of a supporting subfloor, and showing the snap-attachment for locking adjacent planks together.

Referring now specifically to the drawings, a decking structure according to the present invention is illustrated in FIG. 1 and shown generally at reference numeral 10. The decking structure 10 is constructed of an assembly of one-piece modular decking planks 20 mounted to supporting Joists "J" of a subfloor using wood screws "S", as shown in FIG. 2, or other suitable fasteners (not shown). The decking planks 20 are formed of an extruded high impact, UV stabilized polymeric material, such as PVC plastic, and are easily cut with a hand saw or electric circular saw to any desired length. According to the embodiment disclosed, the width of the decking plank 20 is 5.750 inches, and the height is 1.625 inches. The maximum space between adjacent planks is approximately 0.25 inches. Numerous other dimensions are possible within the scope of the invention. Moreover, while a boat dock is illustrated in FIG. 1, the invention has further application in construction of patio decks, piers, walkways, balconies, and the like.

Figure 3:
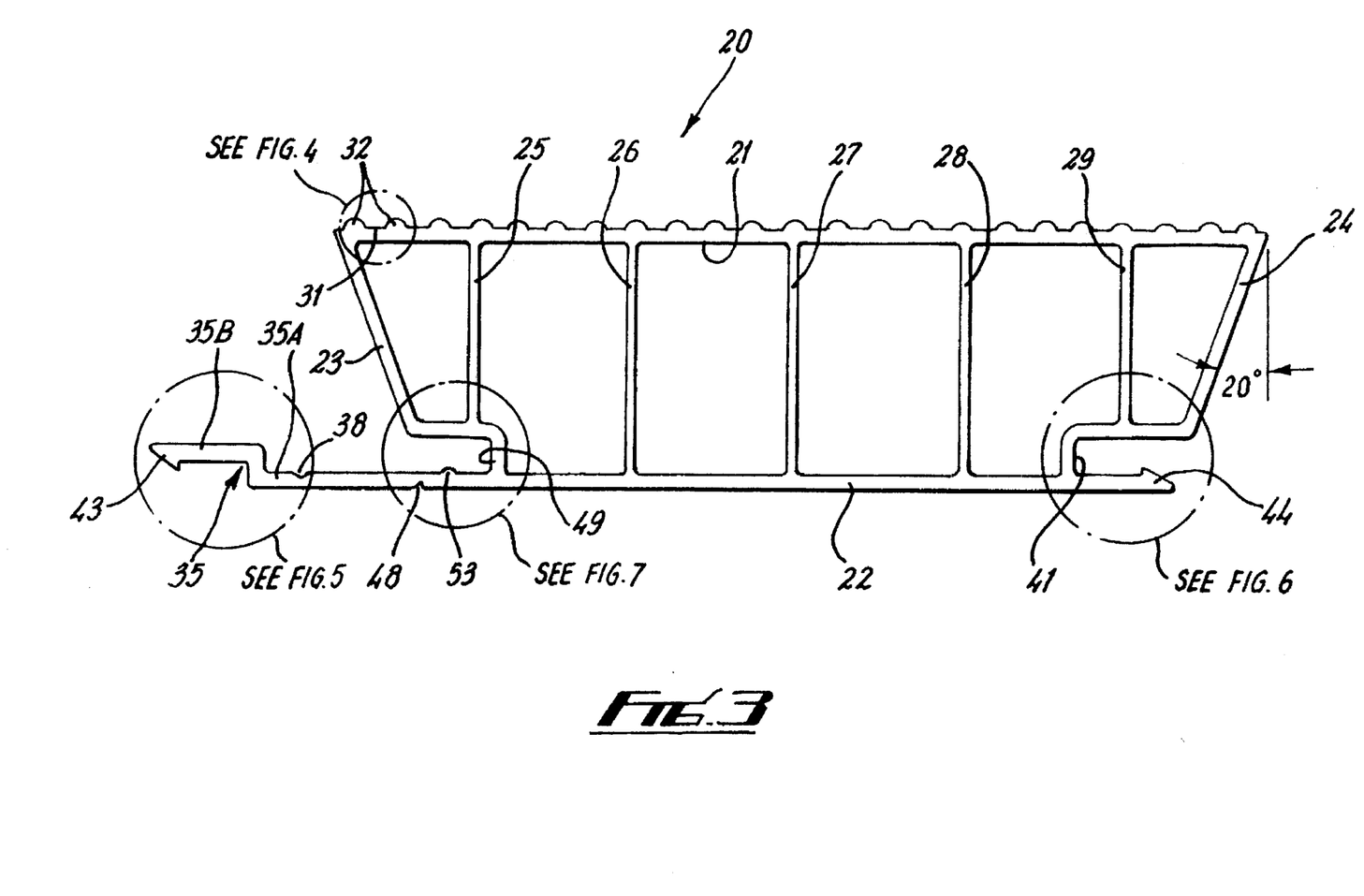
FIG. 3 is an end view of the decking plank.

Referring to FIGS. 2 and 3, the decking plank 20 includes integrally-formed top and bottom walls 21 and 22, and opposing side walls 23 and 24. Integral reinforcing ribs 25, 26, 27, 28, and 29 are located between the side walls 23 and 24, and bridge the top and bottom walls 21 and 22. The ribs 25–29 extend longitudinally from one end of the decking plank 20 to the opposite end for increasing its load-resisting capacity. The side walls 23 and 24 converge towards the bottom wall 22 at an angle of about 20°.

Figure 4:
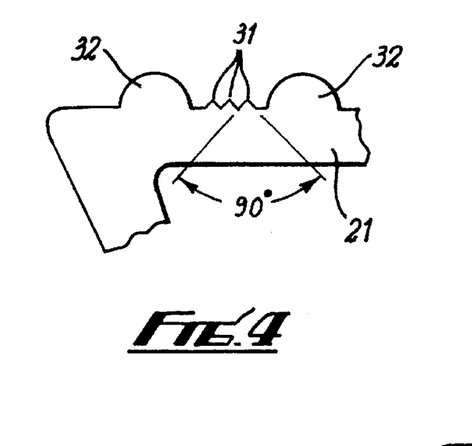
FIG. 4 is an enlarged view of an area outlined in FIG. 3 and labeled "See FIG. 4", and showing a portion of the slip-resistant top surface of the decking plank.

A portion of the top wall 21 is illustrated in detail in FIG. 4. The top surface includes a number of alternately-spaced serrations 31 and risers 32 extending along the entire length of the decking plank 20, and laterally from one side edge of decking plank 20 to the other. In one embodiment, the serrations 31 extend 0.015 inches above the top surface of the decking plank 20, and are spaced approximately 0.030 inches apart from each other. The risers 32 extend 0.062 inches above the top surface, and are spaced approximately 0.25 inches apart. The rough texture provided by the serrations 31 and risers 32 creates a relatively slip-resistant decking surface.

Figure 5:
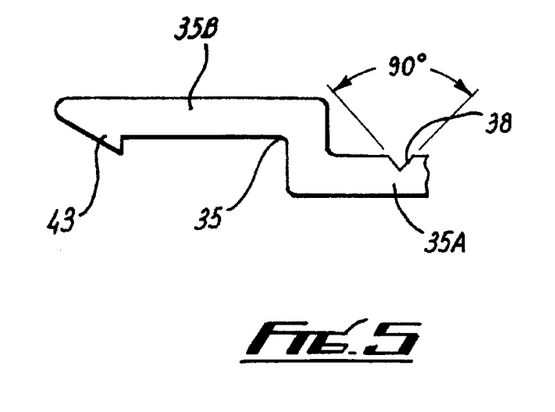
FIG. 5 is an enlarged view of another area outlined in FIG. 3 and labeled "See FIG. 5", and showing the integrally-formed fastener flange of the decking plank.
Figure 6:
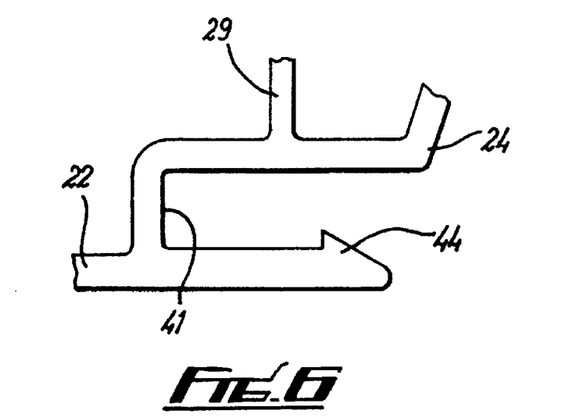
FIG. 6 is an enlarged view of a third area outlined in FIG. 3 and labeled "See FIG. 6", and showing the integrally-formed female fastening channel of the decking plank.
Figure 7:
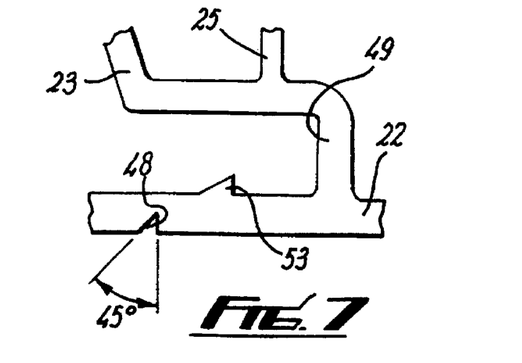
FIG. 7 is an enlarged view of a fourth area outlined in FIG. 3 and labeled "See FIG. 7", and showing the integrally-formed trim channel of the decking plank.

As shown in FIGS. 2, 3, and 5, an integrally-formed fastening flange 35 extends outwardly from and along the bottom wall 22 on one side of the decking plank 20 along its entire length. The fastening flange 35 includes a first fastening portion 35A having a number of spaced openings 37 for receiving the wood screws "S" therethrough to the supporting joists "J", and for water drainage from a top surface of the decking structure 10. According to the preferred embodiment, the openings 37 are spaced 4.0 inches apart along the length of the flange 35 so that the planks 20 can be mounted to standard 16 inch on-center joists "J" with the screws "S". The unused openings 37 between the joists "J" are thus available for drainage.

In addition, particularly for decking planks 20 without preformed openings 37, a small longitudinally extending groove 38 is formed in the flange 35 to help guide the screws "S" through the flange 35 and into the joists "J" of the subfloor. Enhanced water drainage may be achieved by sloping the decking plank 20 slightly from one end to the other. This embodiment of the invention without openings 37 is especially applicable for use in overhead decking whereby an area below the decking is sheltered from rain water runoff.

Figure 13:
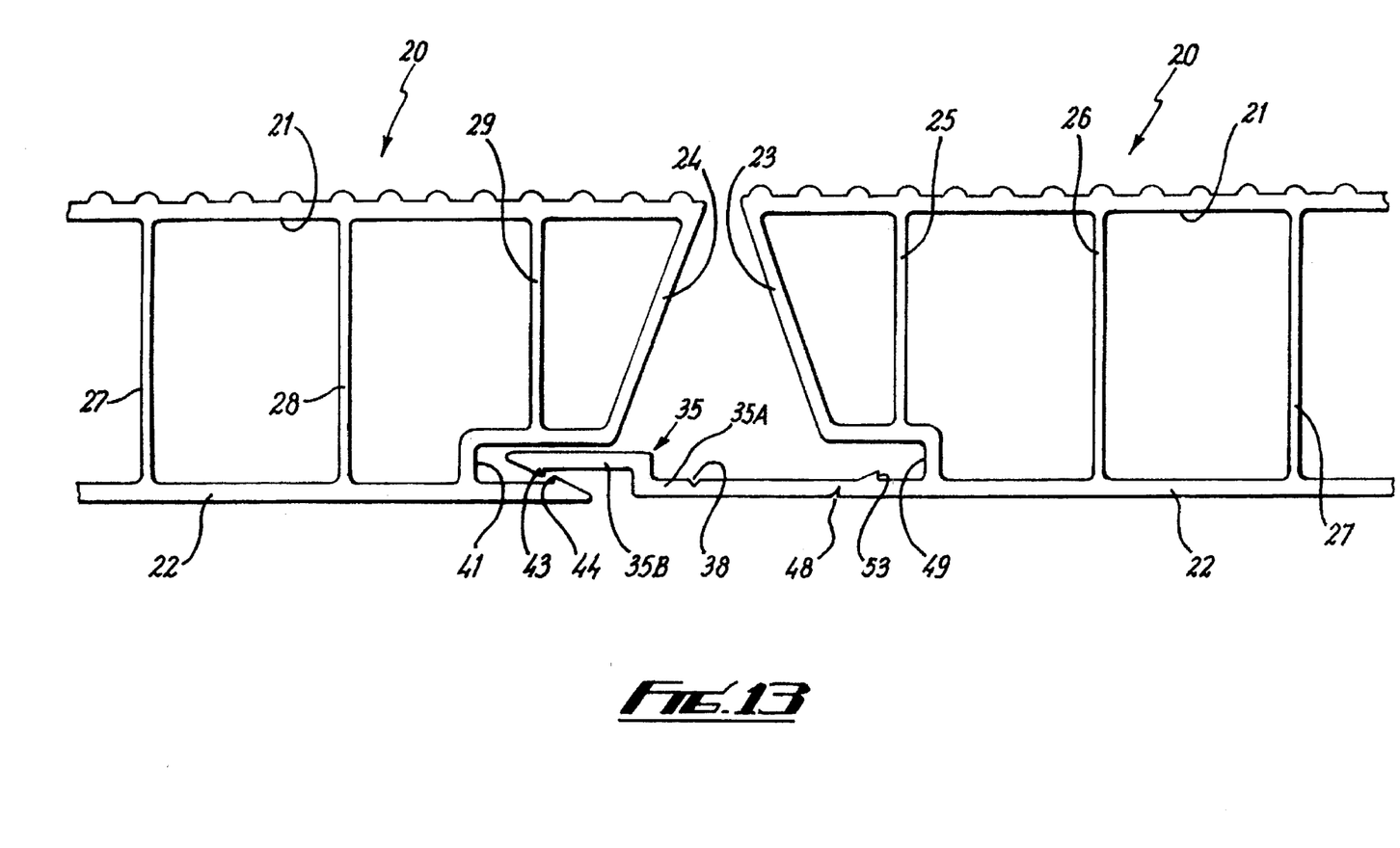
FIG. 13 is a cross-sectional view of two adjacent decking planks attached together.

A second, male fastening portion 35B of the fastening flange 35 is integrally formed with the first portion 35A, and provided for attaching the decking plank 20 to an adjacent like plank. The male portion 35B extends outwardly in a plane above the first fastening portion 35A and resides in substantial mating alignment with a female fastening channel 41 of the adjacent plank 20, as is best shown in FIGS. 3 and 13.

The female fastening channel 41 is integrally formed along the bottom wall 22 on a side of the decking plank 20 opposite the fastening flange 35. The channel 41 extends longitudinally along the entire length of the decking plank 20, and cooperates with the flange 35 to space the adjacent planks 20 from each other and to attach the adjacent planks 20 together. The male fastening portion 35B and channel 41 further include interfering shoulders 43 and 44 for providing a convenient snap-attachment to lock the adjacent decking planks 20 to each other.

Figure 9:
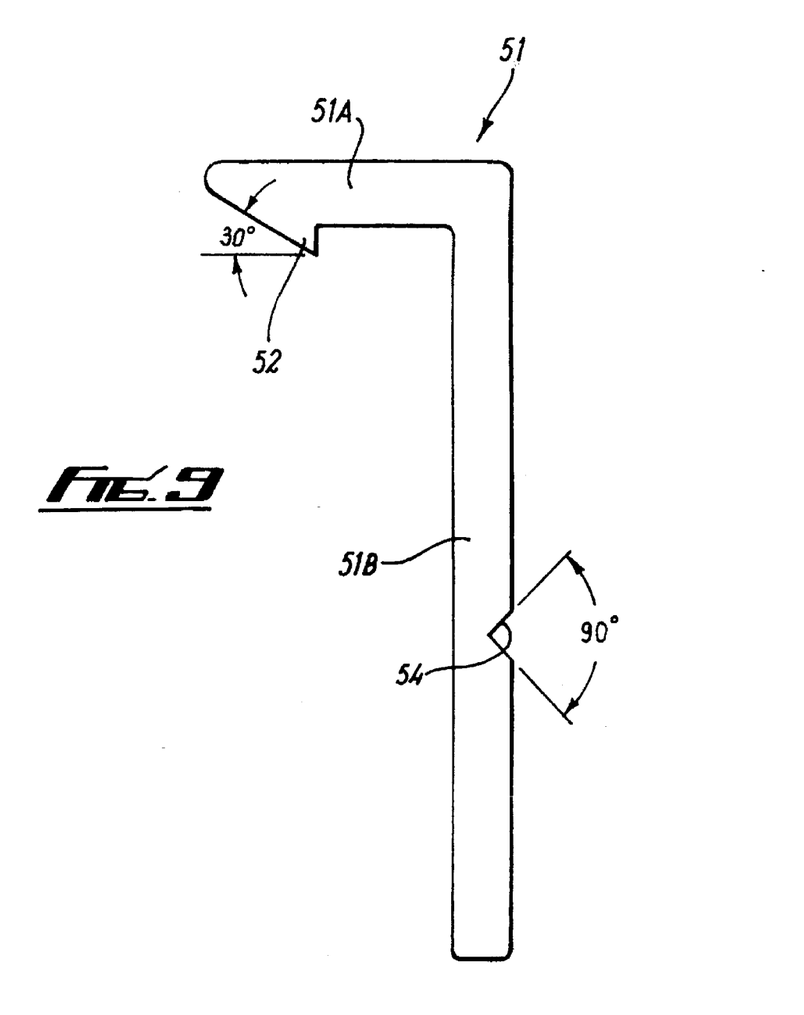
FIG. 9 is an end view of an elongate decking trim section for being attached to a longitudinal side of the decking plank.
Figure 14:
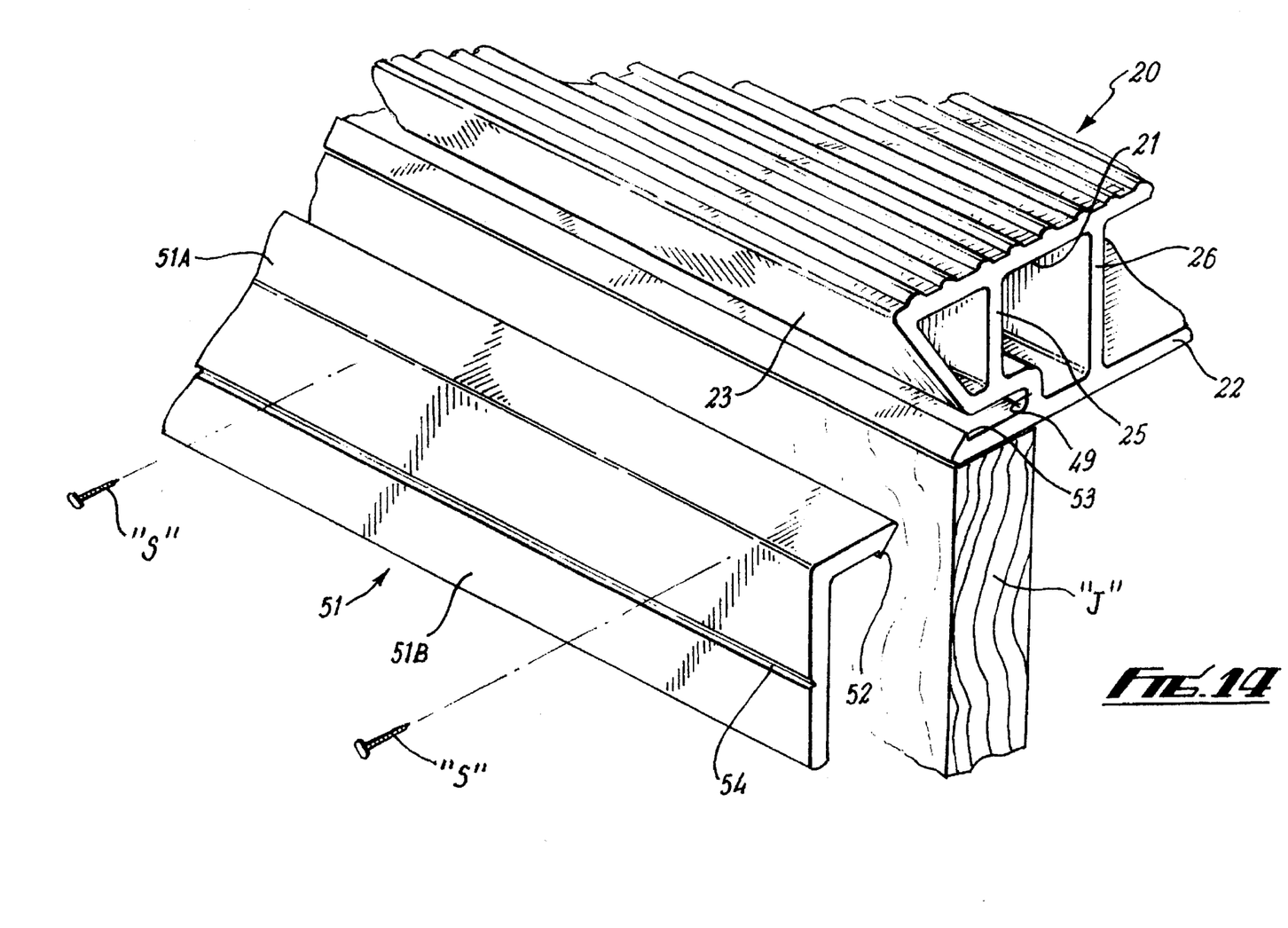
FIG. 14 is a fragmentary, enlarged perspective view of the decking trim for being attached to the decking plank and an exposed side edge of the decking structure.

A second, trim channel 49 is formed in the side wall 23 adjacent to the bottom wall 22 on a side of the decking plank 20 opposite the fastening channel 41 for receiving a male portion 51A of decking trim 51 shown in FIGS. 1, 9, and 14. The decking trim 51 is used to finish an exposed side edge of the decking structure 10, as described further below.

Formation of the Decking Structure 10

Figure 8:
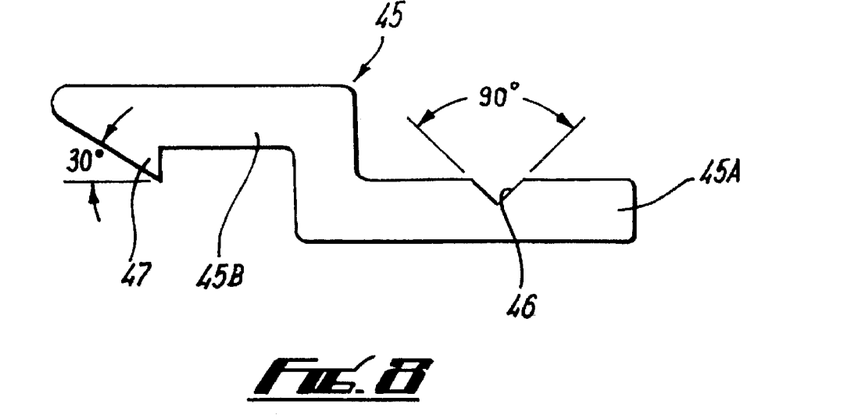
FIG. 8 is an end view of an elongate fastener strip used for initiating decking construction.
Figure 15:
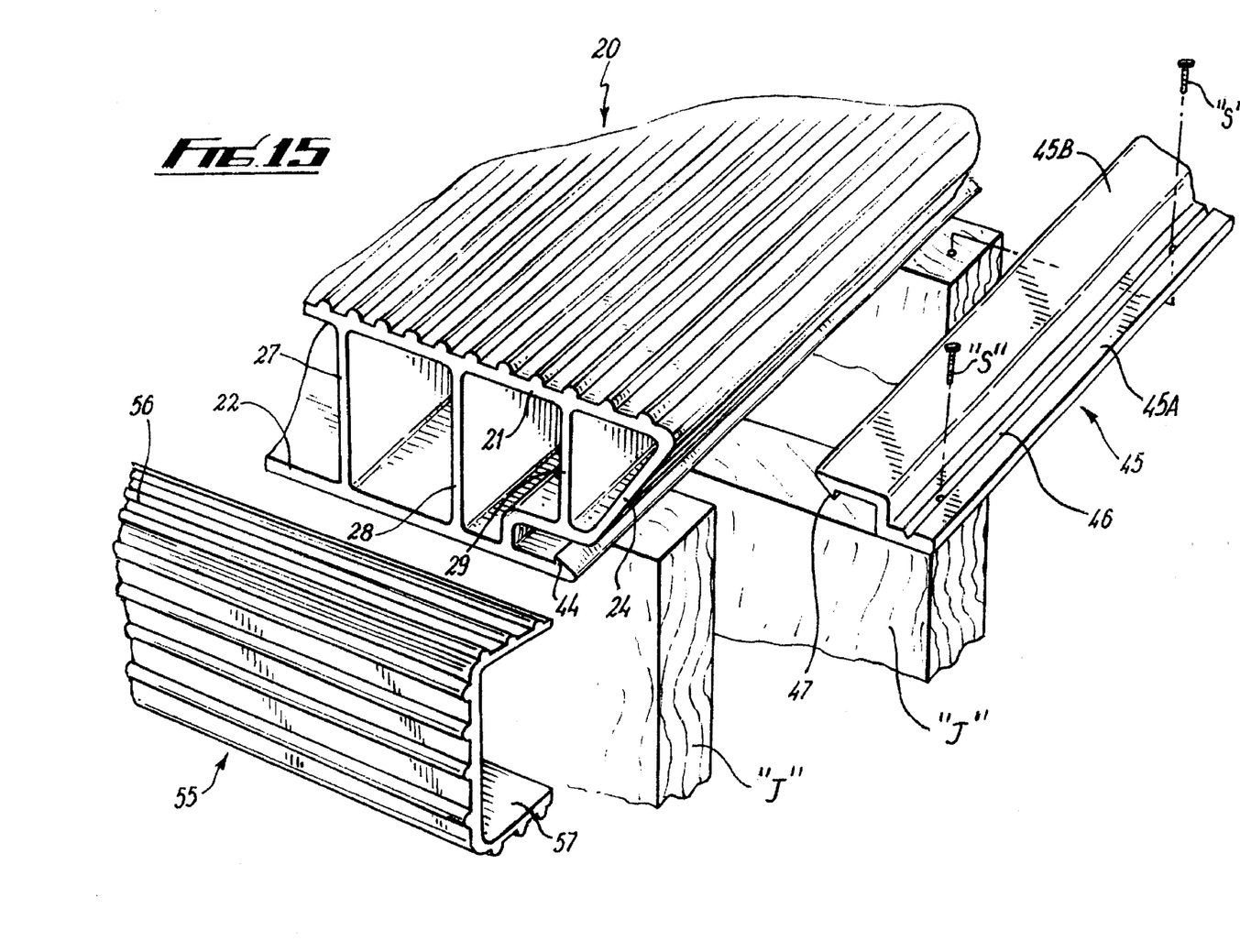

To begin decking construction, an elongate fastener strip 45, shown in FIGS. 1, 8, and 15, is first mounted to the supporting joists "J" at a side edge "E1" of the decking structure 10. A small, longitudinally extending groove 46 is preferably formed in a fastening portion 45A of the strip 45 for guiding wood screws "S" or other fasteners therethrough to the joists "J". A first decking plank 20 is placed on the joists "J", and its female fastening channel 41 snap-attached to a male portion 45B of the fastener strip 45. A locking shoulder 47 is formed with the male portion 45B, and cooperates with the shoulder 44 of the channel 41 to lock the decking plank 20 and fastener strip 45 together. Successive planks 20 are then snap attached together by inserting the fastening flange 35 of a plank 20 into the channel 41 of an adjacent plank 20, as shown in FIG. 13. The planks 20 are secured one-by-one to the joists "J" with screws "S" as described above. The complementary fastening flange 35 and channel 41 of respective, adjacent planks 20 cooperate to space the planks 20 a predetermined distance from each other. Separate spacers (not shown) may be used to achieve exact parallel spacing between adjacent planks 20. All planks 20 are the same shape, will not warp, and are easily mitered.

Referring to FIGS. 1, 3, and 9, upon reaching a second side edge "E2" of the decking structure 10, the fastening flange 35 of the decking plank 20 is readily removed using a saw at a groove 48 of reduced thickness formed at the junction of the bottom wall 22 and fastening flange 35. The groove 48 preferably extends along the entire length of the decking plank 20 and forms a parting line, as described above. After removing the fastening flange 35, the male portion 51A of decking trim 51 is inserted into the trim channel 49 at the side edge "E2" of the decking structure 10. As best shown in FIG. 14, the male portion 51A and trim channel 49 include interfering shoulders 52 and 53 for providing a convenient snap-attachment to lock the trim 51 and decking plank 20 together. A small groove 54 of reduced thickness is formed in the web 51B of the decking trim 51 for receiving screws "S" to secure the trim 51 directly to the supporting joists "J". The joists "J" may be covered with an elongate plastic or vinyl cladding (not shown).

Figure 10:
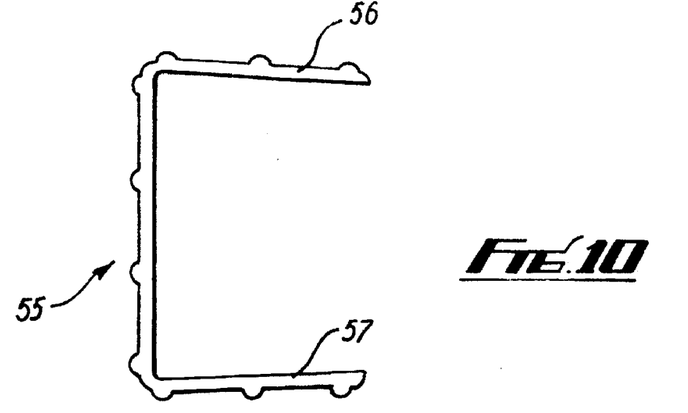
FIG. 10 is an end view of an elongate decking C-cap for being applied to exposed ends of the decking planks.
Figure 11:
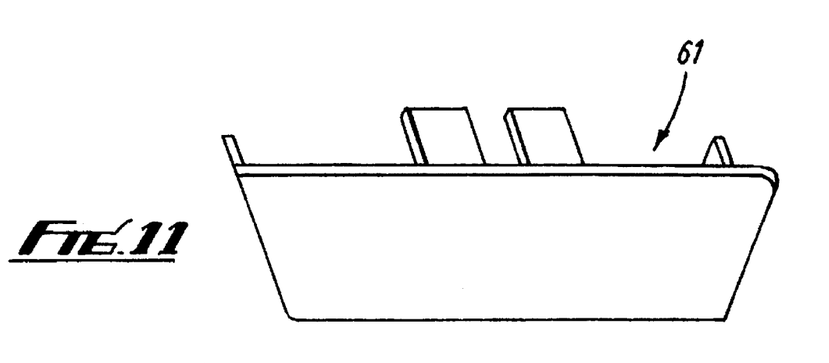
FIG. 11 is a perspective view of an alternative end cap for being applied to a distal end of a single decking plank.

Referring to FIGS. 1, 10, and 15, at an adjacent side edge "E3" of the decking structure 10, an elongate C-shaped cap 55 may be applied to the exposed ends of the decking planks 20 to provide a more attractive and aesthetic side finish. The cap 55 includes spaced apart resilient arms 56 and 57 which slightly converge so that when they are spread and forced onto the exposed ends of planks 20, they frictionally engage the planks 20. One or more caps 55 may be used to finish the exposed side edge "E3". Alternatively, each plank 20 can be fitted with an end cover 61 such as shown in FIG. 11. The face of the cover 61 may include trademark or other advertising information.

Figure 12:
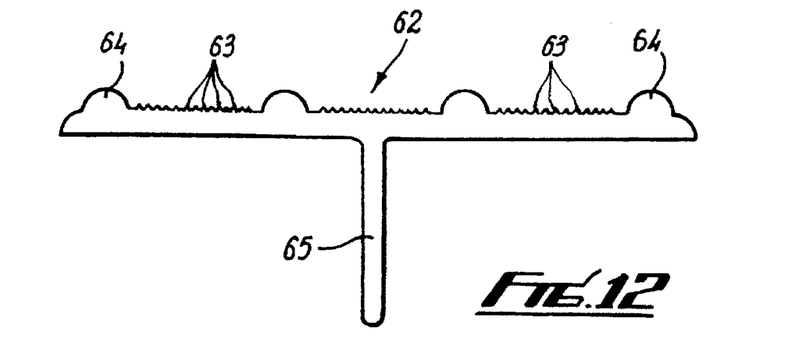
FIG. 12 is an end view of an elongate T-section for being positioned adjacent to abutting ends of the decking planks.

In addition, as shown in FIGS. 1 and 12, an elongate decking T-section 62 may be positioned at mitered, abutting ends of decking planks 20 to provide a uniform and aesthetic transition between the planks 20. The T-section 62 includes a textured top surface with alternately spaced serrations 63 and risers 64, and a center web 65 for residing between the abutting planks 20. The T-section 62 and cap 55 may be further secured to the decking planks 20 with an adhesive or other suitable fastener.

A decking structure formed of decking planks is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An elongate modular decking plank for being assembled on a supporting subfloor together with a plurality of like planks to form a decking structure, said decking plank comprising:

(a) a top wall spaced-apart from a bottom wall, and opposing laterally spaced side walls interconnecting said top and bottom walls to define a void therein, the side walls converging in a direction towards the bottom wall such that the bottom wall is narrower in width than the top wall; and (b) an integrally-formed fastening flange extending outwardly from one of first and second sides of the decking plank, said flange including a fastening portion adapted for receiving fasteners therethrough to the supporting subfloor to mount the decking plank on the supporting subfloor.

2. A modular decking plank according to claim 1, wherein said fastening flange extends continuously along the bottom wall from one end of the decking plank to the other end of the decking plank.

3. A modular decking plank according to claim 1, wherein said fastening flange includes a second, male fastening portion integrally formed with the first fastening portion for attaching the plank to an adjacent like plank.

4. A modular decking plank according to claim 3, wherein the second, male fastening portion of said fastening flange extends in a plane offset from the plane of the first fastening portion.

5. A modular decking plank according to claim 3, and including an integrally-formed female fastening channel extending along the bottom wall on a side of the decking plank opposite said fastening flange for receiving therein a fastening flange of an adjacent decking plank, said flange and said channel of respective adjacent planks adapted for cooperating with each other to space the adjacent planks from each other and to attach the adjacent planks together.

6. A modular decking plank according to claim 5, wherein said female fastening channel extends continuously along the bottom wall from one end of the decking plank to the other end of the decking plank.

7. A modular decking plank according to claim 5, and including locking means for locking the male fastening portion of said fastening flange together with a female fastening channel of an adjacent decking plank.

8. A modular decking plank according to claim 7, wherein said locking means comprises a shoulder formed on the male fastening portion of said fastening flange and adapted for cooperating with an interfering shoulder formed within a female fastening channel of an adjacent decking plank for locking the adjacent decking planks together.

9. A modular decking plank according to claim 1, and comprising a longitudinally-extending groove formed in said fastening flange for guiding the fasteners therethrough to secure the decking plank to the supporting subfloor.

10. A modular decking plank according to claim 1, and including a plurality of spaced-apart holes formed in said fastening flange for accommodating passage of fasteners therethrough to the supporting subfloor, and for drainage of water from the surface of the decking structure.

11. A modular decking plank according to claim 1, and comprising a groove formed along the length of said fastening flange for removing the fastening flange from a decking plank positioned on an exposed edge of the decking structure.

12. A modular decking plank according to claim 11, and comprising a trim channel formed adjacent to the fastening flange for receiving decking trim at the exposed edge of the decking structure.

13. A modular decking plank according to claim 1, wherein said top, bottom, and side walls are integrally formed.

14. A modular decking structure according to claim 1, and including a plurality of reinforcing ribs located between the side walls, and interconnecting the top and bottom walls together.

15. An elongate modular plastic decking plank for being assembled on a supporting subfloor together with a plurality of like planks to form a decking structure, said decking plank comprising:
(a) a top wall spaced-apart from a bottom wall, and opposing laterally spaced side walls interconnecting said top and bottom walls, the side walls converging in a direction towards the bottom wall such that the bottom wall is narrower in width than the top wall;
(b) an integrally-formed fastening flange extending outwardly from a first side of the decking plank from one end of the decking plank to the other, said flange including:
 (i) a first fastening portion for receiving fasteners therethrough to the supporting subfloor; and
 (ii) a second, male fastening portion for attaching the decking plank to an adjacent like plank;
(c) an integrally-formed female fastening channel extending along the bottom wall on a second side of the decking plank from one end of the decking plank to the other for receiving therein a male fastening flange of an adjacent plank, said flange and said channel of respective adjacent planks adapted for cooperating with each other to space the adjacent planks from each other and to attach the adjacent planks together.

16. A modular decking plank according to claim 15, and including locking means for locking the male fastening portion of said fastening flange together with a female fastening channel of an adjacent decking plank.

17. A modular decking plank according to claim 15, and including a plurality of spaced-apart holes formed in said fastening flange for accommodating passage of the fasteners into the supporting subfloor, and for drainage of water from the surface of the decking structure.

18. A modular decking plank according to claim 15, and including a plurality of reinforcing ribs located between the side walls, and interconnecting the top and bottom walls together.

19. A modular decking plank according to claim 15, wherein said top, bottom, and side walls are integrally formed together.

20. A decking structure comprising a plurality of elongate modular decking planks assembled together on a supporting subfloor, each of said decking planks comprising:
(a) a top wall spaced-apart from a bottom wall, and opposing laterally spaced side walls interconnecting said top and bottom walls, the side walls converging in a direction towards the bottom wall such that the bottom wall is narrower in width than the top wall;
(b) an integrally-formed fastening flange extending outwardly from a first side of the decking plank from one end of the plank to the other, said flange including:
 (i) a first fastening portion for receiving fasteners therethrough to the supporting subfloor; and
 (ii) a second, male fastening portion for attaching the decking plank to an adjacent like plank;
(c) an integrally-formed female fastening channel extending along the bottom wall on a second side of the decking plank from one end of the plank to the other for receiving therein the male fastening flange of an adjacent decking plank, said flange and said channel of respective adjacent planks cooperating with each other to space the adjacent decking planks from each other and to attach the adjacent decking planks together.

21. A decking structure comprising a plurality of elongate modular decking planks assembled together on a supporting subfloor, each of said decking planks comprising:
(a) a top wall spaced-apart from a bottom wall, and opposing laterally spaced side walls interconnecting said top and bottom walls to define a void therein, the side walls converging in a direction towards the bottom wall such that the bottom wall is narrower in width than the top wall; and
(b) an integrally-formed fastening flange extending outwardly from one of first and second sides of the decking plank, said flange including a fastening portion for receiving fasteners therethrough to the supporting subfloor to mount the decking plank on the supporting subfloor.

* * * * *